Figure 1:
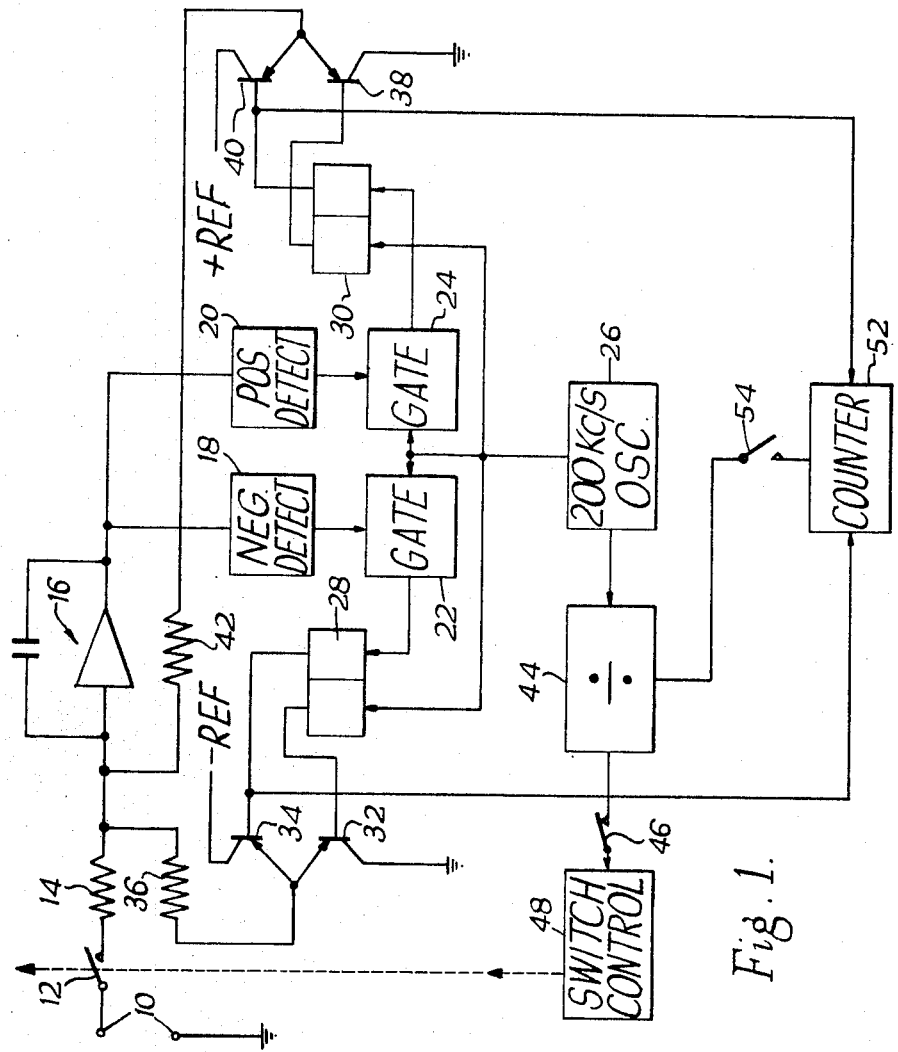

INVENTOR
ROBIN N. ANDERSON
HOWARD A. DOREY
BY
ATTORNEY

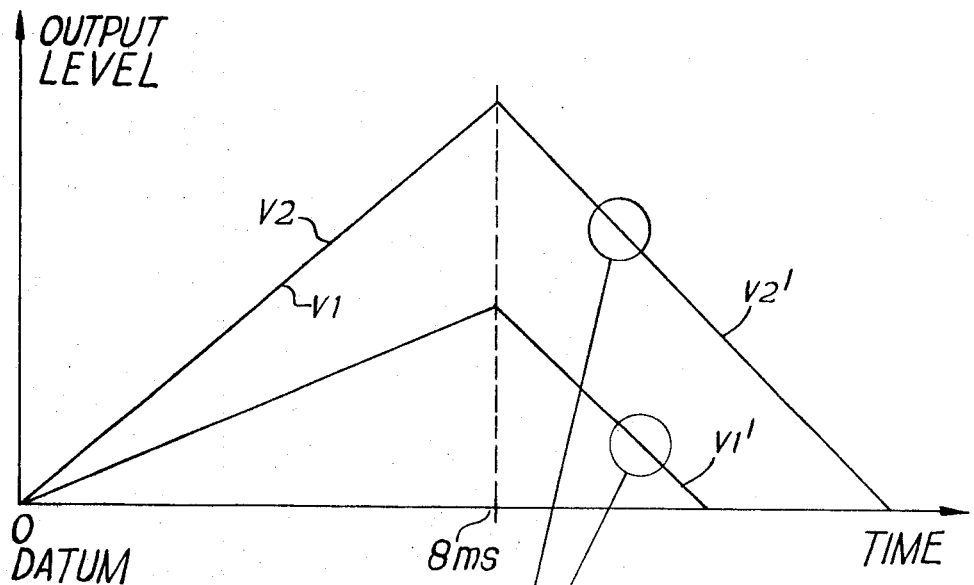
Fig. 2.
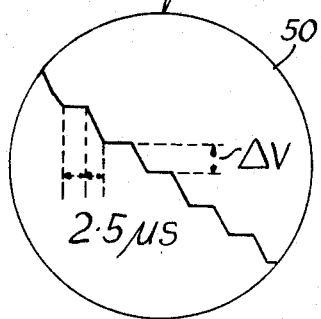

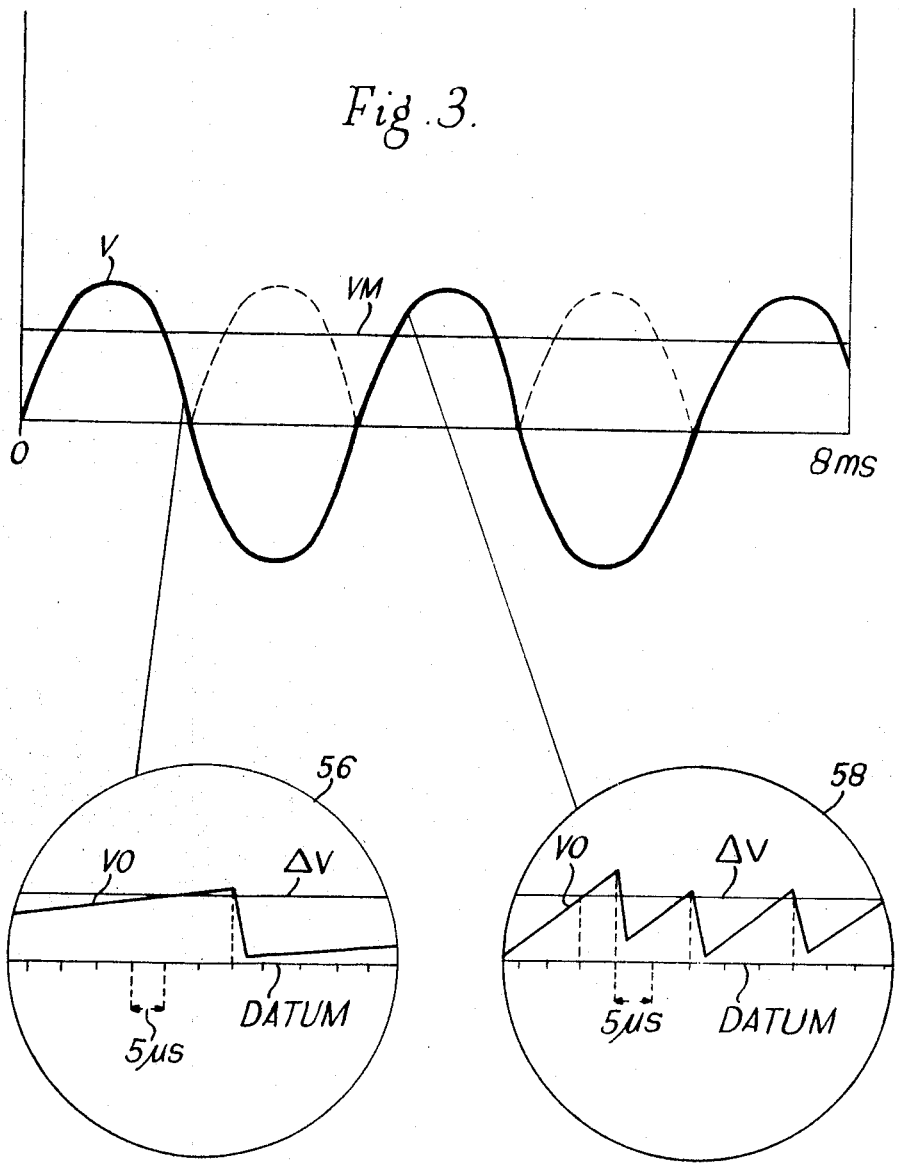

United States Patent Office 3,267,458
Patented August 16, 1966

3,267,458
DIGITAL VOLTMETERS
Robin N. Anderson and Howard A. Dorey, Farnborough,
England, assignors to The Solartron Electronic Group
Limited, Farnborough, England
Filed Aug. 20, 1962, Ser. No. 217,896
Claims priority, application Great Britain, Aug. 24, 1961,
30,582/61
2 Claims. (Cl. 340—347)

The present invention relates to analogue to digital converters and particularly but not exclusively to digital voltmeters, that is to say to voltmeters adapted to display the measured quantity directly in digital form, by the illumination of appropriate numerals for example, rather than in analogue form as by the displacement of a pointer over a scale. A digital display is often required to reduce the likelihood of reading errors and also because the reading can be readily transmitted to a distant point for remote display, operation of a printer and so on.

It will be appreciated that a digital voltmeter is merely an analogue to digital converter put to a particular use. Thus, whilst embodiments of this invention are subsequently described solely as digital voltmeters, it will be appreciated that they could equally well be used to supply a digital signal from an analogue (voltage) input for purposes other than measurement.

It has been proposed to balance the voltage to be measured by a digital voltmeter against a voltage derived by way of a resistive network from a reference voltage, the arrangement of resistors in the network being adjusted automatically until a null is obtained. The particular arrangement the resistors then have gives the value of the voltage. Complexity and expense result and an instrument comparable in performance with the embodiment of this invention subsequently described would require fourteen precision wire-wound resistors for example.

Yet another known method is to generate a linear ramp or staircase waveform, the value of the voltage measured being indicated by the number of time intervals occurring after the start of the ramp or the number of steps in the staircase waveform up to the time at which the ramp or staircase waveform reaches the amplitude of the unknown voltage. Against the disadvantages are complexity and expense if the ramp or staircase waveform generator is to be sufficiently accurate.

It has recently been proposed to apply the voltage to be measured to an integrating amplifier, the output of which is connected to a pulse-forming circuit (trigger circuit) which is triggered by the output of the amplifier so as to feed charge back into the amplifier in opposition to the effect of the applied voltage. The system is entirely free-running and accordingly stabilises in a state in which the frequency at which the pulse-forming circuit triggers is proportional to the applied voltage (the quantum of charge fed each time the circuit triggers being constant). Two pulse-forming circuits responsive to amplifier outputs of different sign and feeding charges of different sign may be utilised to handle positive and negative input voltages. It is quite clear that this arrangement can be used to measure voltage by measuring the frequency of the pulses produced by the pulse-forming circuit. The obvious way to do this is to count the number of pulses occurring in a certain time. To do this an accurate measure of time is necessary and once again the expense and complexity are undesirably increased.

It is therefore an object of the present invention to provide an improved analogue to digital converter which can be used to give an accurate measure of a voltage without the need for any circuits for providing linear ramps, accurate measures of time and so on. This invention has the further advantages that it may measure A.C., charge, or the mean value of a fluctuating voltage whether or not it changes polarity.

According to the present invention, an analogue to digital converter comprises an integrating amplifier to the input of which a voltage to be converted can be applied, a circuit for feeding a standard quantum of charge into the amplifier in opposition to the applied voltage in response to an applied pulse, a source of clock pulses for pulsing the said circuit and means which permit the said circuit to be pulsed only when the output level of the amplifier is beyond a certain value.

In contrast to the voltage to pulse frequency converter described above, the converter according to the invention is not free-running, being controlled by the source of clock pulses, and does not convert to a pulse frequency but to a pulse presence modulation representation. That is to say the applied voltage is proportional to the ratio of pulses actually applied to the circuit (to cause a quantum of charge to be fed into the amplifier) to the total number of available clock pulses, the ratio being expressed over any suitable interval of time long enough for the ratio to have meaning. This ratio can be called the pulse presence ratio and is very easily measured, e.g. by causing a counter to count the number of pulses actually applied during an interval in which a certain standard number of clock pulses occur.

It is particularly important that the pulse presence ratio is independent of the frequency of the clock pulses. The clock pulse generator need not be maintained accurately at a particular frequency (as would be necessary if it had to measure time) and can be allowed to suffer long term frequency drift. All that is necessary is short term stability, sufficient to give a constant frequency (within the limits of accuracy specified) for the duration of the interval taken for a single measurement.

Two circuits for feeding positive and negative quanta of charge can of course be used to measure voltages of either polarity. Such an embodiment of the invention will hereinafter be described in which the only components whose accuracy determines the accuracy of measurement (assuming sufficient short term stability of the clock pulse generator—which is very easily achieved) are three resistors and two Zener diodes.

The clock pulses can be applied through gating means to a switch, the gating means being such that a pulse only reaches the switch when the amplifier output level is beyond the said certain value. Each pulse which reaches the switch causes a reference voltage to be applied to the amplifier input for the duration of the pulse, the reference voltage, duration of the clock pulses and magnitude of a charging resistor in the input to the amplifier together determining the size of the quanta of charge. Separate switches can be provided to deal with excursions in either sense from the datum output level.

In measuring a steady voltage there are two main ways of operating the converter to find the pulse presence ratio. In the first the voltage is applied to the amplifier input for a length of time determined by a specified number of clock pulses. The number of quanta of charge required to bring the amplifier output level back towards the datum level are then counted.

The second way requires the said certain value to correspond closely with the excursion from datum in amplifier output level produced by one quantum of charge. The input voltage is applied continuously and the pulse presence ratio is given by the number of pulses actually applied during the occurrence of a specified number of clock pulses.

In practice, whichever way is used, or a combination of the two methods the number of clock pulses used will be a standard number and the voltage will then be given by the number of pulses applied multiplied by a scaling factor which includes the said standard number. The pulse presence ratio itself will not actually be ascertained.

If it is arranged to sum the number of quanta fed in the predetermined length of time, irrespective of their sign, the count will indicate the mean value (not the R.M.S. value) of an alternating voltage regarded as full-wave rectified, though without the inaccuracies introduced by actual rectification.

Like any other voltmeter, the present instrument can be used to measure current and resistance also. It can further be used to measure charge and hence capacitance. Resistance can be measured by a development of the method for measuring capacitance.

Embodiments of the invention will now be described in greater detail by way of example with reference to the accompanying drawings in which:

FIG. 1 is a block diagram illustrating both ways of using a converter embodying the invention to measure a voltage, and FIGS. 2 and 3 are explanatory diagrams relating to the two ways of use respectively.

Referring to FIG. 1, the voltage to be measured is applied between terminals 10 through a switch 12 and resistor 14 to the input of an integrating amplifier 16. The amplifier can be of conventional design with a high loop gain, consistent with the accuracy desired. The amplifier is preferably chopper drift corrected and has overall capacitive feedback as shown to give the required integration. The datum output level is zero volts and two detector circuits 18 and 20 detect negative and positive output levels respectively which will result from positive and negative inputs respectively on account of the phase reversal occurring in the amplifier. Assuming that one quantum of charge in the system corresponds to a change in amplifier output level of $\Delta V$, then detectors 18 and 20 operate to open gates 22 and 24 respectively when the output level goes beyond $-n\Delta V$ and $+n\Delta V$ respectively. The circuits 18 and 20 can be Schmitt trigger circuits with trigger levels $-n\Delta V$ and $+n\Delta V$. For simplicity we will consider $n=1$ in the remainder of this description.

The gates 22 and 24 control the passage of clock pulses from a 200 kc./s., master timing oscillator 26 of good short term stability to bistables 28 and 30 respectively. The oscillator 26 can be an RC oscillator. The arrangement is such that, so long as either gate 22 or 24 is open, the bistable 28 or 30 as the case may be is set and reset once every $5\mu s$. (that is every cycle of the oscillator 26) the durations of the set and reset states both being $2.5\mu s$. Each bistable remains reset when its gate is closed.

The bistable 28 controls two transistors 32 and 34 acting as switches to apply either zero volts or $-$REF volts to the input of the amplifier 16 through a resistor 36. Thus the collectors of the transistors are connected to earth and $-$REF respectively and the emitters to resistor 36. The reset side of bistable 28 controls the base of transistor 32 and the set side controls the base of transistor 34 so that a quantum of charge $(-\text{REF} \times 2.5\mu s.)/$ R36 is fed into the integrating amplifier 16 in each cycle of the oscillator 26 when the gate 22 is open. R36 is the resistance of resistor 36. The quantum of charge may have a magnitude $8 \times 10^{-13}$ coulombs.

In a similar way the bistable 30 controls transistors 38 and 40 so that either zero volts or $+$REF is applied through a resistor 42 to the amplifier input. By this part of the circuit positive quanta of charge are fed into the amplifier.

It may be mentioned here that the only critical components in the circuits are the three resistors 14, 36 and 42 and the components (Zener diodes for example) giving $+$REF and $-$REF. Since the oscillator 26 determines both the length of time that the switch bistables are set and the duration of the sampling intervals, long term variations in oscillator frequency will not affect the accuracy of the instrument.

The oscillator 26 also feeds a frequency divider circuit 44 which produces 1600 pulses defining approximately 8 ms. intervals. Assuming that the apparatus is being used in the first way, a switch 46 is closed manually and the timing pulses are applied to a switch control circuit 48 which closes the switch 12 for 1600 pulses. The switch control circuit can be a bistable circuit, operating a transistor switch. In this time the output level of the amplifier 16 will rise (negatively or positively according as to whether the voltage to be measured is positive or negative) at a rate depending upon the magnitude of the voltage to be measured. FIG. 2 shows this for two different voltages V1 and V2 which might be 0.05 and 0.1 volt respectively. If resistor 14 is 1 megohm, charges of $4 \times 10^{-10}$ and $8 \times 10^{-10}$ coulombs will flow respectively.

The amplifier output level is brought back within the datum window $\pm \Delta V$ as shown by graphs V1$^1$ and V2$^1$ in FIG. 2, the magnified view 50 of portions of these showing their stepped nature. As a quantum of $8 \times 10^{-13}$ coulombs is fed into the amplifier the output level falls $\Delta V$ in $2.5\mu s$., followed by a stationary interval of $2.5\mu s$.

It is clear that there will be 500 steps in graph V1$^1$ and 1000 in graph V2$^1$. This number is counted by a counter 52 driven from bistable 28 or 30. The count, divided by the appropriate scaling factor of 1000 can be displayed in any of the various well known ways to show the measured voltage 0.1 volt or 0.05 volt. The sign will be displayed in accordance with which of the bistables 28 or 30 is operating and as a precaution it can be arranged that a warning is given if both bistables operate in making a reading. This will indicate that the voltage has changed polarity.

Whilst for clarity the graphs V1$^1$ and V2$^1$ have been shown as following the 8 ms. interval in FIG. 2, it will be appreciated that the quanta of charge can be allowed to feed in right from the start of the 8 ms. interval. The times at which the quanta are fed in is immaterial; it is only the total count that matters.

If the voltage fluctuates over the 8 ms. interval, the measurement will give its mean value over the interval. This has a considerable advantage in that random noise will average out over the interval, enabling accurate readings to be made at low levels. Voltages which alternate in polarity cannot be measured in this first way. The smallest voltage that can be measured is that corresponding to one quantum in the whole interval of closure of the switch 12, namely 0.0001 volt in the present case. If the mode of operation is restricted to the case where the counteracting quanta of charge are fed in at such a rate that the excursion from datum never materially exceeds $\pm(n+1)\Delta V$, or $2\Delta V$ in this case, the maximum voltage that can be measured directly is that corresponding to the number of cycles of the oscillator 26 in the interval of closure of the switch 12. In the present example this voltage is $2 \times 10^5 \times 8 \times 10^{-3} \times 0.0001$ volt, that is 0.16 volt. Higher voltages are measured by means of an input attenuator and accuracies of the order of 0.5% are obtainable in the particular embodiment described.

An advantage of keeping to excursions no exceeding $\pm \Delta V$ is that the value of the feedback capacitor in amplifier 16 can be small. In the second way of operation, now to be described, it is essential to operate so that, as soon as the excursion becomes $+\Delta V$ or $-\Delta V$, it is brought back towards the datum level on the occurrence of the next clock pulse by the operation of bistable 30 or 28. With this provision switch 12 can remain closed all the time and the magnitude of the voltage across terminals 10 is at all times indicated by the pulse presence ratio.

In operating in the second way then, the switch 46 is opened, whereupon circuit 48 closes switch 12 permanently. A switch 54 is closed so that circuit 44 controls the counter 52 causing it to count only over the interval of 1600 pulses. The counter will therefore indicate the number of pulses actually applied to the bistable 28 or 30 during the interval of 1600 clock pulses.

If the counter 52 is arranged to count additively on operation of *either* bistable it is clear that the negative portions of the input waveform will be treated as if rectified and the value indicated by the counter will be the mean value of the full wave rectified input. Provided the shape of the waveform is known the peak-to-peak value and also the R.M.S. value are therefore known.

This in indicated in FIG. 3 where a sinusoidal input V is shown. Negative half cycles are treated as if inverted and the value indicated by the counter 52 is the mean value VM. What happens at the time scale of the oscillator frequency is shown in enlarged views 56 and 58 for low and high values of V respectively.

As shown in view 56, when V is small the output level VO rises slowly and it is only in the occasional 5μs. interval that a counteracting quantum of charge restores VO to the datum. When V is larger, VO rises more rapidly and, as view 58 shows, quanta of charge are fed in more frequently.

The alternating input must have a frequency appreciably lower than the frequency of oscillator 26 if a meaningful result for VM is to be obtained. If the frequency of V is 100 times less than that of the oscillator an accuracy of the order of 0.2% is possible. If the frequency of V is only 10 times less, the accuracy drops to about 1%.

It should be noted that the input impedance is the same for A.C. and D.C. measurements, 1 megohm in the example given, which is a higher impedance for A.C. measurement than usual.

In measuring an alternative voltage, a blocking capacitor can be used to keep out any steady voltage. On the other hand, if the counter 52 counts additively and subtractively for bistables 28 and 30 respectively, the mean D.C. component of an alternating voltage will be indicated. The counter 52 can be a differential counter of known form. If additive and subtractive counting is required the outputs from the two bistables are applied to the two counter inputs respectively. For counting additively on operation of either bistable, the outputs from the two bistables are applied to one and the same counter input. The two bistables never operate simultaneously so there is no problem of pulses masking one another.

Clearly the sampling period must include several cycles of an alternating voltage and if the frequency is low a longer period than 8 ms. must be employed. A suitable longer period is 0.8 sec. and the circuit 44 can be provided with a switch which will select the sampling interval of 0.8 sec. or 8 ms. as required.

The highest frequencies that can be measured are set by the maximum speed at which the transistor switches can be operated, bearing in mind that they must operate at 10 times the frequency of the voltage to be measured to obtain 1% accuracy. In practice the frequency range which can be covered satisfactorily in the particular embodiment described is 10 c./s. to 20 kc./s.

Direct and alternating currents are readily measured by passing them through standard resistors, measuring the voltage drop across the resistor.

To measure capacitance, the capacitor is charged to a reference voltage and discharged into the voltmeter. The charge Q is measured as $N \times \Delta Q$ where $\Delta Q$ is the value of one quantum of charge and N is the number of quanta counted. Capacitance equals Q divided by the reference voltage. Capacitors can be compared very easily as capacitance is directly proportional to N.

Resistance is most conveniently measured using a standard capacitor C which is discharged into the junction of the resistor 14, of value R and the unknown resistor of value RX, the other end of RX being earthed. If V is the instantaneous voltage on C, the total charge flowing into the integrator is $$Q = \int_0^x V/R \, dt$$

Now $dV/dt = (V/C)(RX+R)/(RX \cdot R)$ so that substituting for $V dt$ we have $$Q = \int_0^{V_{REF}} (1/R)(CR \cdot RX)/(RX+R) \, dV$$

If R is very much greater than RX this simplifies to $Q = (V_{REF} \, C/R) RX$ and the reading is linearly proportional to RX.

Since the resistor 14 in the particular embodiment described may be 40 megohm resistors up to 400 kilohm can be measured directly to 1% accuracy. If a charge is fed back into the capacitor equal to the charge taken by the input resistor, the range can be extended to 10 megohms.

We claim:

1. An analogue to digital converter for use as a voltmeter comprising: an integrating amplifier; a switch connected to the input of said amplifier for applying thereto a voltage to be measured; a circuit responsive to an applied pulse to feed a fixed quantity of charge into said amplifier in opposition to the applied voltage; a source of clock pulses for pulsing the said circuit; means responsive to the output of said amplifier to permit the said circuit to be pulsed when the output level of said amplifier is beyond a predetermined value; means responsive to the clock pulses to close the said switch for a standard number of clock pulses; and a counter for counting the number of times that the said circuit is pulsed.

2. An analogue to digital converter comprising: an integrating amplifier; means for applying a voltage to be converted to the input of said amplifier; first and second circuits connected to said amplifier, said circuits being responsive to apply pulses to feed positive and negative fixed quantities of charge respectively into said amplifier; a source of clock pulses for pulsing the said circuits; first means for permitting said first circuit to be pulsed only when the amplifier output level is more negative than a predetermined nagative value; second means for permitting said second circuit to be pulsed only when the amplifier output level is more positive than a predetermined positive value; a counter for counting each time either of the said circuits is pulsed; and means, operatively connected to said source of clock pulses and said counter for limiting the period of operation of said counter to a predetermined time interval.

References Cited by the Examiner
UNITED STATES PATENTS

| | | | |
|---|---|---|---|
| 3,042,911 | 7/1962 | Paradise et al. | 340—347 |
| 3,051,939 | 8/1962 | Gilbert | 340—347 |
| 3,188,455 | 6/1965 | Quick | 340—347 |

References Cited by the Applicant
UNITED STATES PATENTS

| | | |
|---|---|---|
| 2,885,663 | 5/1959 | Curtis. |

OTHER REFERENCES

"An Analogue R-C Integrator With a Digital Output" by Jarrett in the Proceedings of the National Electronics Conference, vol. 16, pages 611, etc. (1960).

ROBERT C. BAILEY, *Primary Examiner.*

MALCOLM A. MORRISON, *Examiner.*

K. R. STEVENS, *Assistant Examiner.*